(12) United States Patent (10) Patent No.: US 9,137,866 B2
McBryde et al. (45) Date of Patent: Sep. 15, 2015

(54) EMERGENCY LIGHTING CONVERSION FOR LED STRINGS

(71) Applicant: Cree, Inc., Durham, NC (US)

(72) Inventors: James Andrew McBryde, Raleigh, NC (US); Jun Zhang, Cary, NC (US)

(73) Assignee: Cree, Inc., Durham, NC (US)

( * ) Notice: Subject to any disclaimer, the term of this patent is extended or adjusted under 35 U.S.C. 154(b) by 179 days.

(21) Appl. No.: 13/943,376

(22) Filed: Jul. 16, 2013

(65) Prior Publication Data

US 2014/0132164 A1 May 15, 2014

Related U.S. Application Data

(63) Continuation-in-part of application No. 13/749,082, filed on Jan. 24, 2013, and a continuation-in-part of application No. 13/676,791, filed on Nov. 14, 2012, which is a continuation-in-part of application No.

(Continued)

(51) Int. Cl.
*H05B 37/00* (2006.01)
*H05B 39/00* (2006.01)
*H05B 41/00* (2006.01)
*H05B 33/08* (2006.01)

(52) U.S. Cl.
CPC .................................. *H05B 33/0815* (2013.01)

(58) Field of Classification Search
USPC ...................................... 315/185, 36, 49, 177
See application file for complete search history.

(56) References Cited

U.S. PATENT DOCUMENTS

| 3,283,169 | A | 11/1966 | Libaw |
| 4,213,064 | A | 7/1980 | Frosch et al. |
| 4,540,917 | A | 9/1985 | Luchaco et al. |
| 4,682,147 | A | 7/1987 | Bowman |
| 5,408,403 | A | 4/1995 | Nerone et al. |

(Continued)

FOREIGN PATENT DOCUMENTS

| WO | WO 2009/010802 A2 | 1/2009 |
| WO | WO 2010/127366 A2 | 11/2010 |

(Continued)

OTHER PUBLICATIONS

Notification of Transmittal of the International Search Report and the Written Opinion of the International Searching Authority, or the Declaration, PCT/US13/68905, Date of Mailing: Apr. 7, 2014, 12 pages.

(Continued)

*Primary Examiner* — Adam Houston
(74) *Attorney, Agent, or Firm* — Myers Bigel Sibley & Sajovec, P.A.

(57) ABSTRACT

Emergency lighting devices and methods are disclosed. An emergency lighting device includes a passive resonant converter circuit configured to be coupled to an emergency lighting module and to an input end of a group of solid state emitters, at which the group of solid state emitters receives a normal operation current from an LED driver. The passive resonant converter circuit is configured to receive an emergency operation current from the emergency lighting module and to provide a converted emergency operation current to the group of solid state emitters at an emergency input of the group of solid state emitters in response to the emergency operation current. The emergency lighting module may be a fluorescent emergency lighting module.

34 Claims, 12 Drawing Sheets

Related U.S. Application Data

13/466,304, filed on May 8, 2012, and a continuation-in-part of application No. 13/466,312, filed on May 8, 2012, and a continuation-in-part of application No. 13/466,324, filed on May 8, 2012, now Pat. No. 8,823,272.

(60) Provisional application No. 61/840,724, filed on Jun. 28, 2013, provisional application No. 61/569,588, filed on Dec. 12, 2011.

(56) References Cited

U.S. PATENT DOCUMENTS

| | | | |
|---|---|---|---|
| 5,466,992 | A | 11/1995 | Nemirow et al. |
| 5,488,269 | A | 1/1996 | El-Hamamsy et al. |
| 5,598,326 | A | 1/1997 | Liu et al. |
| 5,734,230 | A | 3/1998 | Edwards et al. |
| 5,739,639 | A * | 4/1998 | Johnson .......................... 315/86 |
| 5,895,986 | A | 4/1999 | Walters et al. |
| 5,925,990 | A | 7/1999 | Crouse et al. |
| 6,320,330 | B1 * | 11/2001 | Haavisto et al. ............... 315/291 |
| 6,333,605 | B1 | 12/2001 | Grouev et al. |
| 6,362,575 | B1 | 3/2002 | Chang et al. |
| 6,411,045 | B1 | 6/2002 | Nerone |
| 6,507,157 | B1 | 1/2003 | Erhardt et al. |
| 6,509,657 | B1 | 1/2003 | Wong et al. |
| 6,936,968 | B2 | 8/2005 | Cross et al. |
| 7,027,010 | B2 | 4/2006 | Lee |
| 7,067,992 | B2 | 6/2006 | Leong et al. |
| 7,138,994 | B2 | 11/2006 | Cho et al. |
| 7,507,001 | B2 | 3/2009 | Kit |
| 7,511,971 | B2 | 3/2009 | Lim |
| 7,863,832 | B2 | 1/2011 | Lane et al. |
| 8,089,213 | B2 | 1/2012 | Park |
| 8,310,172 | B2 | 11/2012 | Negrete |
| 8,322,878 | B2 | 12/2012 | Hsia et al. |
| 8,358,056 | B2 | 1/2013 | Park |
| 8,461,794 | B2 | 6/2013 | Schrod et al. |
| 2005/0029966 | A1 | 2/2005 | Buonocunto |
| 2005/0068459 | A1 * | 3/2005 | Holmes et al. ................. 348/372 |
| 2007/0138972 | A1 | 6/2007 | Siessegger |
| 2007/0273290 | A1 | 11/2007 | Ashdown et al. |
| 2008/0055077 | A1 | 3/2008 | Lane et al. |
| 2008/0266849 | A1 | 10/2008 | Nielson et al. |
| 2010/0079091 | A1 | 4/2010 | Deixler et al. |
| 2010/0096976 | A1 | 4/2010 | Park |
| 2010/0135000 | A1 | 6/2010 | Smith, III et al. |
| 2010/0237840 | A1 | 9/2010 | Walter et al. |
| 2010/0244981 | A1 | 9/2010 | Gorbachov |
| 2010/0259239 | A1 | 10/2010 | Shi et al. |
| 2010/0270941 | A1 | 10/2010 | Hui |
| 2010/0277070 | A1 | 11/2010 | Butteris et al. |
| 2011/0006691 | A1 | 1/2011 | Blaha et al. |
| 2011/0043035 | A1 | 2/2011 | Yamada et al. |
| 2011/0043136 | A1 | 2/2011 | Radermacher |
| 2011/0080116 | A1 | 4/2011 | Negley et al. |
| 2011/0109164 | A1 | 5/2011 | Mohammed Suhura et al. |
| 2011/0121754 | A1 | 5/2011 | Shteynberg et al. |
| 2011/0121756 | A1 | 5/2011 | Thomas et al. |
| 2011/0140611 | A1 | 6/2011 | Elek et al. |
| 2011/0140612 | A1 | 6/2011 | Mohan et al. |
| 2011/0309760 | A1 * | 12/2011 | Beland et al. ................. 315/201 |
| 2012/0161666 | A1 | 6/2012 | Antony et al. |
| 2012/0242241 | A1 | 9/2012 | Schmacht |
| 2012/0280637 | A1 * | 11/2012 | Tikkanen et al. ............. 315/294 |
| 2013/0049613 | A1 | 2/2013 | Reed |
| 2013/0063027 | A1 | 3/2013 | Recker et al. |
| 2013/0113390 | A1 * | 5/2013 | Oh et al. ........................ 315/291 |
| 2013/0119868 | A1 * | 5/2013 | Saxena et al. ................. 315/122 |
| 2014/0132164 | A1 * | 5/2014 | McBryde et al. .............. 315/187 |
| 2014/0203714 | A1 * | 7/2014 | Zhang et al. ............... 315/185 R |
| 2014/0204571 | A1 * | 7/2014 | Zhang et al. ................... 362/222 |
| 2014/0300655 | A1 * | 10/2014 | Kato ............................... 345/691 |
| 2015/0008844 | A1 * | 1/2015 | Wilson .......................... 315/291 |
| 2015/0015076 | A1 * | 1/2015 | Park ............................... 307/66 |
| 2015/0015145 | A1 * | 1/2015 | Carrigan et al. .............. 315/131 |
| 2015/0021988 | A1 * | 1/2015 | Barnetson et al. .............. 307/23 |
| 2015/0048685 | A1 * | 2/2015 | Wilson ........................... 307/66 |
| 2015/0091463 | A1 * | 4/2015 | Jin ................................. 315/201 |

FOREIGN PATENT DOCUMENTS

| | | |
|---|---|---|
| WO | WO 2011/124721 A1 | 10/2011 |
| WO | WO 2012/104800 A2 | 8/2012 |
| WO | WO 2013/124827 A1 | 8/2013 |
| WO | WO 2014/115010 A1 | 7/2014 |

OTHER PUBLICATIONS

Notification of Transmittal of the International Search Report and the Written Opinion of the International Searching Authority, or the Declaration, PCT/US13/68910, Date of Mailing: Apr. 4, 2014, 13 pages.

Notification Concerning Transmittal of International Preliminary Report on Patentability and PCT Written Opinion of the International Searching Authority, PCT/US2012/068991, Date of Mailing: Jun. 26, 2014, 9 pages.

Ribarich; *Driver—Off-Line LED Control Circuit*; LED Professional Review; Jan./Feb. 2009; pp. 21-24.

Chen N. et al., "A Driving Technology for Retrofit LED Lamp for Fluorescent Lighting Fixtures With Electronic Ballasts", *IEEE Transactions on Power Electronics*, vol. 26, No. 2, Feb. 2011, 588-601.

Invitation to Pay Additional Fees Corresponding to International Application No. PCT/US12/68984; Date of Mailing: Feb. 1, 2013; 2 Pages.

International Search Report Corresponding to International Application No. PCT/US2012/069126; Date of Mailing: Feb. 20, 2013; 17 Pages.

International Search Report and Written Opinion Corresponding to International Application No. PCT/US12/68987; Date of Mailing; Feb. 26, 2013; 14 Pages.

International Search Report Corresponding to International Application No. PCT/US12/68991; Date of Mailing: Mar. 4, 2013; 10 Pages.

Notification of Transmittal of the International Search Report and the Written Opinion of the International Searching Authority, or the Declaration, PCT/US12/68984, May 10, 2013.

Johnson B., "Controlling power and cost for multiple LEDs", *EE Times*, Nov. 5, 2006, Retrieved on Feb. 6, 2013 from URL, http://eetimes.com/design/power-management-design/4012121/Controlling-power-and-cost-for-multiple-LEDs?pageNumber.

International Preliminary Report on Patentability mailed May 28, 2015 for corresponding PCT International Application No. PCT/US2013/068910 (12 pages).

Capacitor-Input Filter, Dec. 12, 2011, http://en.wikipedia.org/w/index.php?title=Capacitor-input_filter?oldid=465397872 (2 pages).

Capacitor-Input Filter, Dec. 4, 2012, http://en.wikipedia.org/w/index.php?title=Capacitor-input_filter?oldid=526350197 (2 pages).

Chan, Design of Differential Filters for High-Speed Signal Chains, Application Report SLWA053B, Apr. 2010, http://www.ti.com/lit/an/slwa053b/slwa053b.pdf (pp. 1-7).

Chen, A Driving Technology for Retrofit LED Lamp for Fluorescent Lighting Fixtures with Electronic Ballasts, pp. 588-601, IEEE Trans. on Power Electronics, vol. 26:2, Feb. 2011.

Galvanic Isolation, Sep 12, 2011, http://en.wikipedia.org/w/index.php?title-Galvanic_isolation&oldid=449965801 (2 pages).

Horowitz at al., The Art of Electronics, p. 32, 1989, Cambridge University Press, Cambridge.

Impedance Matching, Nov. 16, 2012, http://en.wikipedia.org/w/index.php? title=impedance_matching&oldid=523347621 (12 pages).

Tony Kuphaldt, Lessons in Electric Circuits, vol. 11-AC, Chapter 7: Mixed-Frequency AC Signals, Chapter 9: Transformers, pp, 152-188; 217-281, Jul. 25, 2007, http://www.ibiblio.org/kuphaldt/electricCircuits/Ac/A C.pdf.

Lee, Robust Passive LED Driver Compatible with Conventional Rapid-Start Ballast, pp. 3694-3706, Dec. 2011, IEEE Trans. on Power Electronics, vol. 26:12.

(56) References Cited

OTHER PUBLICATIONS

Malvino et al, 2008, Basic Electronics (MSBTE), 3-12 Series Inductor Filter, pp. 94-95, Tata McGraw-Hill Company Limited.
Ali Niknejad, Electromagnetics for High-Speed Analog and Digital Communication Circuit, Chapter 7: Resonance and Impedance Matching, Chapter 10: Transformers, pp. 168-200, 293-319, 2007, Cambridge University Press, Cambridge.
Pyakuryal et al, Filter Design for AC to DC Converter, pp. 42-49, Jun. 2013, IRJES, http://www.irjes.com/Papers/vol. 2-issue6/Version-1/E02064249.pdf, vol. 2:6.
The Inductor, p. 3, Nov. 20, 2012, http://www.talkingelectronics.com/projects/Inductor/Inductor-3. html.
Vishay Intertechnology, AC Film Capacitors in Connection with the Mains, pp. 301-303, Jan. 7, 2009, Vishay Intertechnology, http://www.eettaiwan.com/STATIC/PDF/200903/20090304_Vishay_AN02.pdf?Sources=Download.
A. Vitanza et al, Electronic Fluorescent Lamp Ballast, pp. 1-10, 1999, STMicroelectronics Application Note AN427/1294, http://ww.st.com/static/acdtive/cn/resource/technical/document/ application_note/CD00003901.pdf.
Zhang et al, A Capacitor-Isolated LED Driver with Inherent Current Balance Capability, pp. 1708-1716; Apr. 2012, IEEE Trans. Indust Electronics vol. 59.
Zhu et al, Novel Capacitor-Isolated Power Converter, pp. 1824-1829, Sep. 2010, Energy Conversion Congress and Exposition (ECCE), 2010 IEEE held in Atlanta, Ga.
Third Party Submission Filed on Jun. 4, 2015 Corresponding to U.S. Appl. No. 14/256,573, 3 pages.
Third Party Submission Filed on Apr. 17, 2015 Corresponding to U.S. Appl. No. 14/256,573, 2 pages.
Third Party Submission Filed on Mar. 27, 2015 Corresponding to U.S. Appl. No. 14/256,573, 3 pages.
Third Party Submission Filed on Apr. 16, 2015 Corresponding to U.S Appl. No. 13/943,455, 3 pages.
Third Party Submission Filed on Apr. 21, 2015 Corresponding to U.S. Appl. No. 13/943,455, 4 pages.
Third Party Submission Filed on Apr. 20, 2015 Corresponding to U.S. Appl. No. 13/943,455, 3 pages.
Third Party Submission Filed on Jun. 9, 2015 Corresponding to U.S. Appl. No. 13/749,082, 3 pages.
Third Party Submission Filed on May 20, 2015 Corresponding to U.S Appl. No. 13/749,082, 3 pages.

* cited by examiner

EMERGENCY LIGHTING CONVERSION FOR LED STRINGS

CROSS REFERENCE TO RELATED APPLICATIONS

The present application claims the benefit of and priority to U.S. Provisional Patent Application No. 61/840,724, filed Jun. 28, 2013, entitled "Emergency Lighting Conversion For LED Strings", and is a continuation-in-part of U.S. patent application Ser. No. 13/749,082, filed Jan. 24, 2013, entitled "LED Lighting Apparatus For Use With AC-Output Lighting Ballasts", and a continuation-in-part of U.S. patent application Ser. No. 13/676,791, filed Nov. 14, 2012, entitled "Emergency Lighting Devices With LED Strings," which claims the benefit of and priority to U.S. Provisional Patent Application No. 61/569,588, filed Dec. 12, 2011, entitled "Emergency Lighting Systems And Methods For Solid State Lighting Apparatus," is a continuation-in-part to U.S. patent application Ser. No. 13/466,304, filed May 8, 2012, entitled "Emergency Lighting Systems And Methods For Solid State Lighting Apparatus," is a continuation-in-part to U.S. patent application Ser. No. 13/466,312, filed May 8, 2012, entitled "Dimming Control For Emergency Lighting Systems," and is a continuation-in-part to U.S. patent application Ser. No. 13/466,324, filed May 8, 2012, entitled "Emergency Lighting Systems Including Bidirectional Booster/Charger Circuits," the disclosures of which are hereby incorporated herein by reference in their entirety.

FIELD

The present application relates to emergency lighting systems, and in particular to emergency lighting systems for fluorescent and solid state luminaires and related methods.

BACKGROUND

Emergency lighting, sometimes referred to as egress lighting, is lighting that is activated in the event of power loss. One purpose of emergency lighting is to allow occupants of a building to safely exit the building in the event of a power outage or other emergency. Emergency lighting is mandated for use in commercial buildings by many electrical codes. Such codes generally specify the amount of light that must be provided in the event of power loss and the duration of time for which such light must be provided. For example, U.S. building codes require emergency lighting to provide one footcandle of light for a minimum of 90 minutes along the path of egress during a power outage.

Emergency lighting is commonly provided by emergency light fixtures that are installed with fluorescent luminaires that provide light in non-emergency situations. Solid-state lighting devices may be attractive for replacing these fluorescent luminaires and may offer improved energy efficiency, reduced heat generation, extended life and desired performance characteristics, such as certain color and/or color rendering capabilities. However, the LEDs may require a different emergency lighting module and replacing the existing fluorescent emergency lighting modules would be expensive.

SUMMARY

Embodiments of this disclosure include emergency lighting devices and methods for operating groups of solid state emitters with existing emergency lighting modules. According to some embodiments, an emergency lighting device includes a passive resonant converter circuit configured to be coupled to an emergency lighting module and to an input end of a group of solid state emitters. The emergency lighting device may be a fluorescent emergency lighting device. The group of solid state emitters receives a normal operation current from an LED driver at the input end of the group of solid state emitters. The passive resonant converter circuit is configured to receive an emergency operation current from the emergency lighting module and provide a converted emergency operation current to the group of solid state emitters at an emergency input of the group of solid state emitters in response to the emergency operation current.

According to further embodiments, the passive resonant converter circuit is configured to support power transfer from the emergency lighting module to the group of solid state emitters without active voltage or current regulation.

According to some embodiments, the emergency lighting device includes an isolation transformer coupled to the passive resonant converter circuit and configured to receive the emergency operation current.

According to further embodiments, the passive resonant converter circuit includes a passive rectifier circuit and a resonant circuit. The resonant circuit may include a resonant CL circuit comprising at least one inductor coupled in series with the group of solid state emitters and at least one capacitor coupled in parallel with the at least one inductor and the group of solid state emitters.

According to some embodiments, an emergency lighting device, such as a lamp, includes a first group of solid state emitters configured to emit light of a first color and having an input end and an output end. The emergency lighting device also comprises a passive resonant converter circuit coupled to an emergency lighting module and to the input end of the first group of solid state emitters. The first group of solid state emitters is configured to receive a normal operation current from an LED driver at the input end of the group of solid state emitters. The passive resonant converter circuit is configured to receive an emergency operation current from a emergency lighting module and provide a converted emergency operation current to the first group of solid state emitters at an emergency input of the first group of solid state emitters.

According to some embodiments, a method of operating an emergency lighting device includes receiving a normal operation current from an LED driver at a group of solid state emitters such that the normal operation current is input from the LED driver at the input end of the group of solid state emitters and output at an output end of the group of solid state emitters. The method also includes, upon determination of an emergency mode, receiving an emergency operation current from an emergency lighting module at a passive resonant converter circuit coupled to the emergency lighting module and the input end of a group of solid state emitters. The method further includes providing a converted emergency operation current from the passive resonant converter circuit to the group of solid state emitters at an emergency input of the group of solid state emitters in response to the emergency operation current.

According to some embodiments, an emergency lighting device, such as a lamp, includes a first group of solid state emitters configured to emit light of a first color and having an input end and an output end, a second group of solid state emitters configured to emit light of a second color having an input end and an output end, and a third group of solid state emitters configured to emit light of a third color having an input end and an output end. The first, second and third groups of solid state emitters are configured to receive a normal operation current from an LED driver during normal mode at the input ends of the first, second and third groups of solid state emitters. The emergency lighting device also includes a passive resonant converter circuit configured to be coupled to an emergency lighting module and an emergency input of the first, second and third groups of solid state emitters. The passive resonant converter circuit is configured to receive an emergency operation current from a emergency lighting module during emergency mode and provide a converted emergency operation current to the first, second and third groups of solid state emitters at the emergency input.

According to further embodiments, the emergency lighting device may include a first diode electrically connected between a location on the third group of solid state emitters and a first location on the second group of solid state emitters and a second diode electrically connected between a second location on the second group of solid state emitters and a location on the first group of solid state emitters. Upon determination of an emergency mode, the converted emergency operation current is input at an emergency location of the third group of solid state emitters and output at an emergency location of the first group of solid state emitters.

According to some embodiments, the emergency lighting module is a multi-string LED driver configured to separately provide normal operation current to the input ends of the first, second and third groups of solid state emitters.

According to further embodiments, the emergency lighting device may include an isolation transformer coupled to the passive resonant converter circuit and configured to receive the emergency operation current.

According to some embodiments, a method of operating an emergency lighting device includes receiving a normal operation current from an LED driver at first, second and third groups of solid state emitters. The method includes, upon determination of an emergency mode, receiving an emergency operation current from an emergency lighting module. The method also includes providing a converted emergency operation current to the first, second and third groups of solid state emitters at an emergency input located between the input end and the output end of the first group of solid state emitters, wherein the converted emergency operation current continues through a first diode electrically connecting the first group of solid state emitters to the second group of solid state emitters, continues through a second diode electrically connecting the second group of solid state emitters to the third group of solid state emitters, and is output at an emergency output located between the input end and the output end of the third group of solid state emitters.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
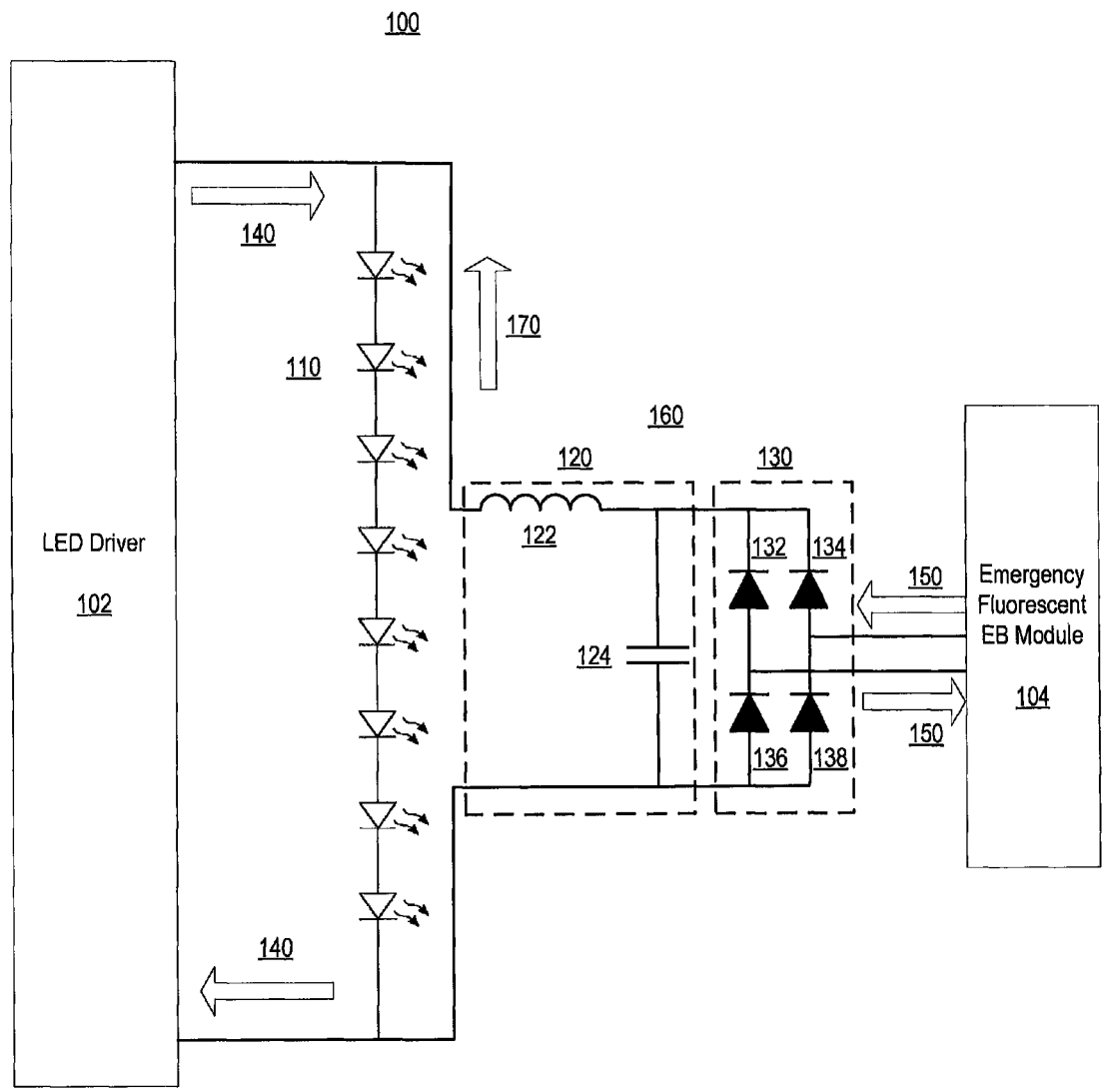
FIG. 1 is a diagram of an emergency lighting device for powering solid state emitters with a fluorescent emergency lighting module, according to various embodiments.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The expression "lighting apparatus" or "lighting device", as used herein, is not limited, except that it indicates that the device is capable of emitting light. That is, a lighting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device. The present inventive subject matter may further relate to an illuminated enclosure (the volume of which can be illuminated uniformly or non-uniformly), comprising an enclosed space and at least one lighting device according to the present inventive subject matter, wherein the lighting apparatus illuminates at least a portion of the enclosed space (uniformly or non-uniformly).

Lighting devices with strings of LEDs may be driven by an LED driver under normal operation. When there is a loss at disruption of power to the LED strings, an emergency lighting module, such as an emergency LED driver controlled by an emergency lighting module, operates in an emergency mode. The emergency LED driver supplies an emergency operation current to the LED strings. The emergency current may be drawn from an auxiliary source, such as a rechargeable battery pack. However, many existing emergency lighting modules drive fluorescent bulbs, which may require different power configurations than strings of LEDs. Replacing these fluorescent emergency lighting modules with LED emergency drivers may be cost-prohibitive. Therefore, the lighting devices may not be able to take full advantage of LED lighting.

Embodiments of this disclosure describe emergency lighting devices that power strings of LEDs with existing fluorescent emergency lighting modules. According to various embodiments, a fluorescent emergency lighting module may connect to a passive resonant converter circuit that connects to one or more LED strings and provides a DC voltage signal to the LED strings. It will be appreciated that the passive resonant converter circuit may be provided together with the LED strings as an integral part of an LED lamp or as separate components. Moreover, the LED strings may have various configurations and/or numbers of LEDs.

Current technology does not merge fluorescent and LED components into a single application. The fluorescent market is very segregated from the LED market. Embodiments described herein allow a user to upgrade to LED lighting components, while still allowing fluorescent emergency lighting module (ELM) accessories to be used.

FIG. 1 illustrates an emergency lighting device 100 according to some embodiments. The lighting device 100 includes an LED driver 102 that drives a current 140 through the LED string 110 under normal operation. The lighting device 100 also includes a passive resonant converter circuit 160, which may include a resonant circuit 120 and a passive rectifier 130.

The passive resonant converter circuit 160 can receive emergency operation current 150 from a fluorescent or other gas-discharge lamp ballast, such as the fluorescent emergency lighting module 104. The emergency fluorescent lighting module 104 may be included in an existing fluorescent lighting fixture that is being retrofitted to use LED strings as a replacement for at least one fluorescent tube or compact fluorescent lamp (CFL). The passive resonant converter circuit 160 may be configured to provide a converted emergency operation current 170, rectified and filtered, through the LED string 110. The passive resonant converter circuit 160 may be configured to provide converted emergency operation current 170 to the LED string 110 without performing voltage or current regulation, unlike, for example, an active DC power supply. In some embodiments, passive resonant converter circuit 160 may be configured to substantially match an output impedance of the emergency fluorescent lighting module 104, thus providing control of a relatively efficient power transfer between the emergency fluorescent lighting module 104 and the LED string 110. Generally, the converted emergency operation current 170 through the LED string 110 may be a function of the inductance, capacitance and the LED voltage, with the power delivered to the LED being a function of the LED current and voltage.

The passive resonant converter circuit 160 may comprise a passive rectifier circuit 130 and a resonant circuit 120, according to some embodiments. As shown in FIG. 1, an input of passive rectifier circuit 130 may be coupled to emergency fluorescent lighting module 104, and an input of resonant circuit 120 may be coupled to an output of passive rectifier 130. The LED string 110 may be coupled to an output of the resonant circuit 120.

Figure 2:
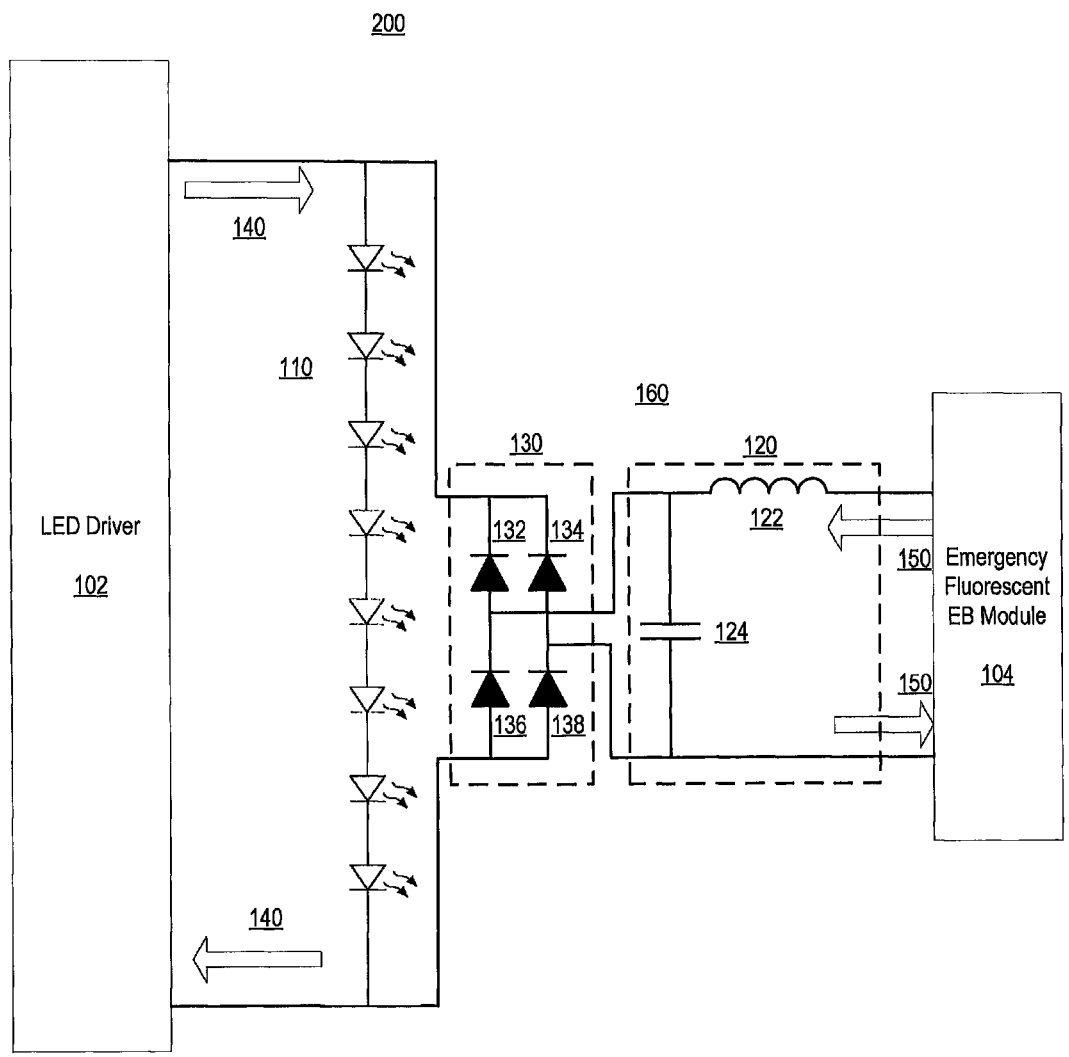
FIG. 2 is a diagram of an emergency lighting device for powering solid state emitters with a fluorescent emergency lighting module, according to various embodiments.

In some embodiments, the arrangement of the rectifier circuit 130 and the resonant circuit 120 may be reversed. As shown in FIG. 2, the resonant circuit 120 of the lighting device 200 may be connected to the emergency fluorescent lighting module 104, with the rectifier circuit 130 being connected between resonant circuit 120 and the LED string 110. In some embodiments, the emergency fluorescent lighting module 104 may be an electronic ballast including a resonant AC/AC power supply of the type commonly used in fluorescent, high intensity discharge (HID) and other gas discharge lighting application. In other embodiments, the emergency fluorescent lighting module 104 may be powered by a backup battery. The resonant circuit 120 may be configured to provide impedance matching for an output of the emergency fluorescent lighting module 104. The resonant circuit 120 may include a resonant LC output circuit.

The passive rectifier 130 may include a passive diode bridge full-wave rectifier circuit including diodes 132-138, according to some embodiments. As shown in FIG. 1, a first port of the rectifier circuit 130 is coupled to the emergency fluorescent lighting module 104. A second port of the rectifier circuit 130 is coupled to an input port of the resonant circuit 120. The resonant circuit 120 may include a CL filter circuit including a capacitor 124 and an inductor 122 connected in a parallel/series arrangement. A CL form for the resonant circuit 120 may be particularly advantageous because the emergency fluorescent lighting module 104 may have relatively high source impedance, while the LED string 110 may present relatively low load impedance. Placing the capacitor 124 between the inductor 122 and the emergency fluorescent lighting module 104 can reduce voltage oscillations and/or provide additional impedance control. An output port of the resonant circuit 120 is coupled to the LED string 110.

It will be appreciated that the rectifier circuit 130 and/or the resonant circuit 120 may take other forms in other embodiments. For example, the resonant circuit 120 may comprise other types of resonant circuits, such as series resonant circuits or other arrangements. In some embodiments, the resonant circuit 120 may be configured to provide impedance matching with a resonant tank output circuit in the emergency fluorescent lighting module 104.

In some embodiments, a blocking capacitor may be used to block lower-frequency AC currents which may be undesirable for the operation of the LED string 110. Such a blocking capacitor may also be useful, for example, to prevent use of lighting device 100 with an older non-electronic ballast that produces a relatively low frequency (e.g., 50/60 Hz) output instead of the significantly higher frequency outputs produced by typical electronic ballasts, which may be more suitable for driving LEDs. In some embodiments, the lighting device 100 may interface with another type of emergency module, which uses a half-bridge output circuit that drives a load through a resonant circuit including an inductor, a capacitor and a resistor.

In certain applications, such as in replacement lamp applications in fluorescent troffer-type fixtures, wires leading from the ballast may provide significant inductance, which may lead to undesirable voltages being generated at the input of lighting circuitry configured as described above. According to some embodiments, the lighting device 100 may include the rectifier circuit 130 and the resonant circuit 120 that drive the LED string 110 with the addition of a snubber circuit, including a resistor and two capacitors. The snubber circuit may limit voltage developed across the input of the rectifier circuit 130 due to the inductance of the wires that couple the lighting device 100 to the fluorescent emergency lighting module 104.

Figure 3:
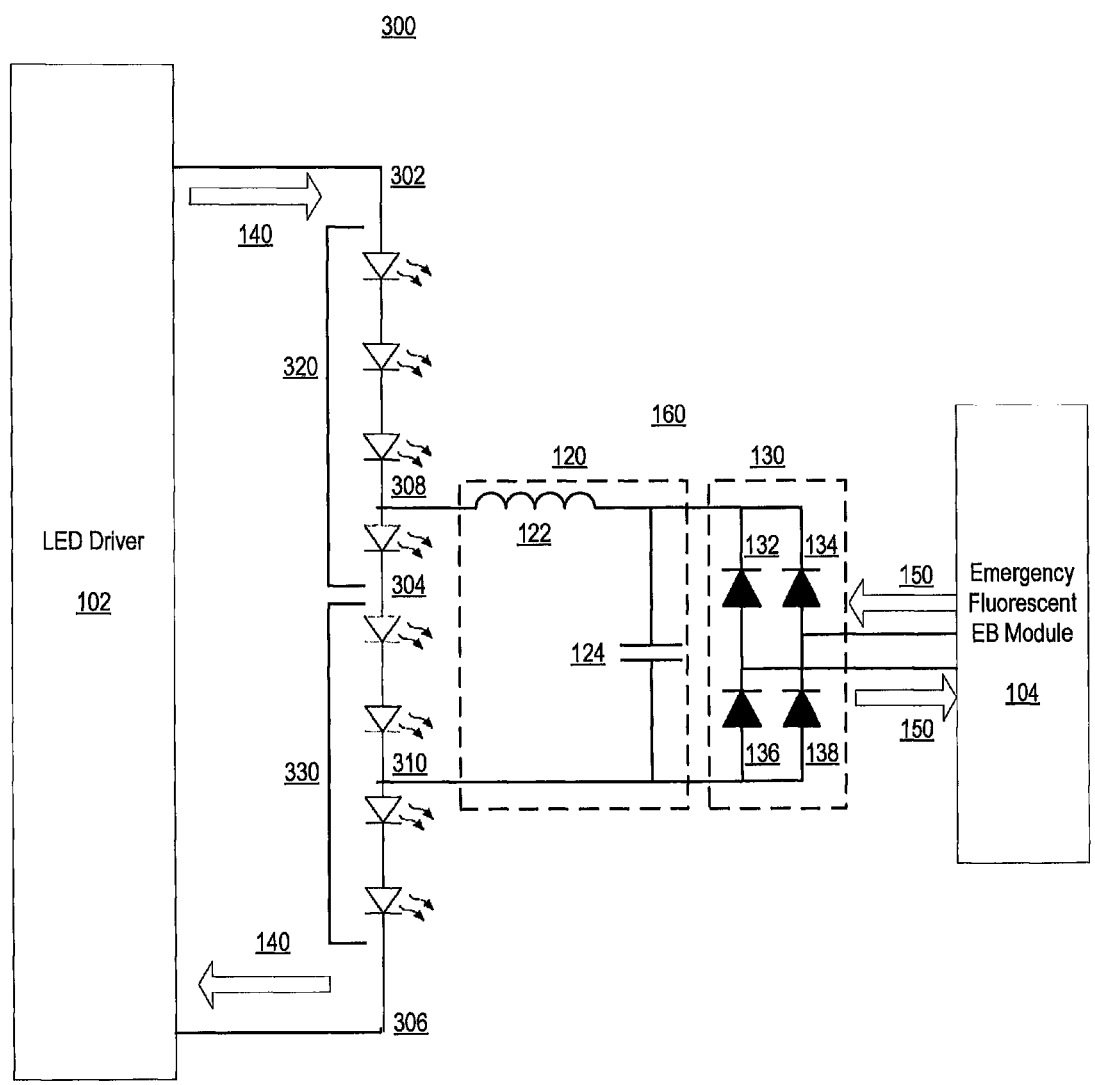
FIG. 3 is a diagram of an emergency lighting device for powering solid state emitters with a fluorescent emergency lighting module, according to various embodiments.

Emergency lighting modules, such as those described above, may be used with the emergency lighting device in diagram 300 of FIG. 3. FIG. 3 shows a first group or string of solid state emitters or LEDs 320. The first LED string 320 has an input end 302 and an output end 304. The first LED string 320 is electrically connected in series to a second LED string 330, which has an input end 304 and an output end 306.

In the emergency lighting device 300, a normal operation current 140 is received from the LED driver 102 at the input end 302 of the first LED string 320. The normal operation current 140 continues to the second LED string 330 and out the output end 306. The first string 320 may be one color while the second string 330 may be another color. Shunt circuitry may be used to shunt current from the second string 330 in order to adjust a color emitted from the second string 330.

According to a further embodiment, the first string 320 emits light of a non-white color, such as a blue-shifted yellow (BSY) color, and the second string 330 emits light of a red color. The mixture of the light emitted from these two strings is a target white color with a more favorable color rendering index (CRI) than typical white lights. That is, the target white light may provide more accurate color rendition of an object that reflects the light.

In the embodiment of FIG. 3, the passive resonant converter circuit 160 of the lighting device 300 supplies a converted emergency operation current to the first LED string 320 at emergency input 308 that is output at emergency output 310. The converted emergency operation current may be provided upon a determination that the lighting device is operating in emergency mode. This emergency mode determination may be based on a loss, reduction, or disruption in emergency operation current 150. The emergency fluorescent lighting module 104 may detect this current change.

The emergency input 308 may be placed between the input 302 and the output 304 of the first string 320. The position may be configured or adjusted in coordination with the location of the emergency output 310, located between the input end 304 and output end 306 of the second LED string 330. This coordination may provide for a mixture of light emitted in emergency mode that is similar to the mixture of light emitted by the two strings in normal operation. A ratio of the number of the first LED string 320 lights to the number of the second LED string 330 lights may be configured based on a target mixture of light, such as a target white light. In some embodiments, the color point may be different during emergency operation mode. In some embodiments, a ratio may include two BSY LEDs for every red LED. In further cases, the placement of the emergency input 308 and emergency output 310 may be determined in order to maintain this ratio. Although the ratio is the same, the total number of LEDs may be reduced. This may be necessary as the emergency fluorescent lighting module 104 may supply a smaller emergency operation current 150 than the normal operation current 140. For example, the LED driver 102 may apply a DC voltage of 200V on the first and second strings 320 and 330 during normal operation. However, the emergency fluorescent lighting module 104, by nature of the stored battery power available after a mainline power loss during emergency operation, may apply only 30-40V after conversion across the emergency input 308 and emergency output 310.

According to other embodiments, the placement of the emergency input 308 and emergency output 310 may be reconfigured to both be located between the input end 302 and output end 304 of first string 320. In other cases, both ends are located on the second string 330.

The lighting device 300 may be configured so that the location of emergency input 308 and emergency output 310 are adjustable based upon a specification of an emergency lighting module such as the emergency fluorescent lighting module 104, according to some embodiments. For instance, if an existing emergency fluorescent lighting module 104 had a certain voltage or power rating, the location of emergency input 308 and emergency output 310 may be selectable so as to meet certain light emission requirements or color and luminance targets with emergency fluorescent lighting module 104. In some cases, there may be multiple locations to select from. In other cases, emergency inputs and outputs may be mechanically or electrically adjusted to include any determined number of solid state emitters on each of the strings.

Figure 4:
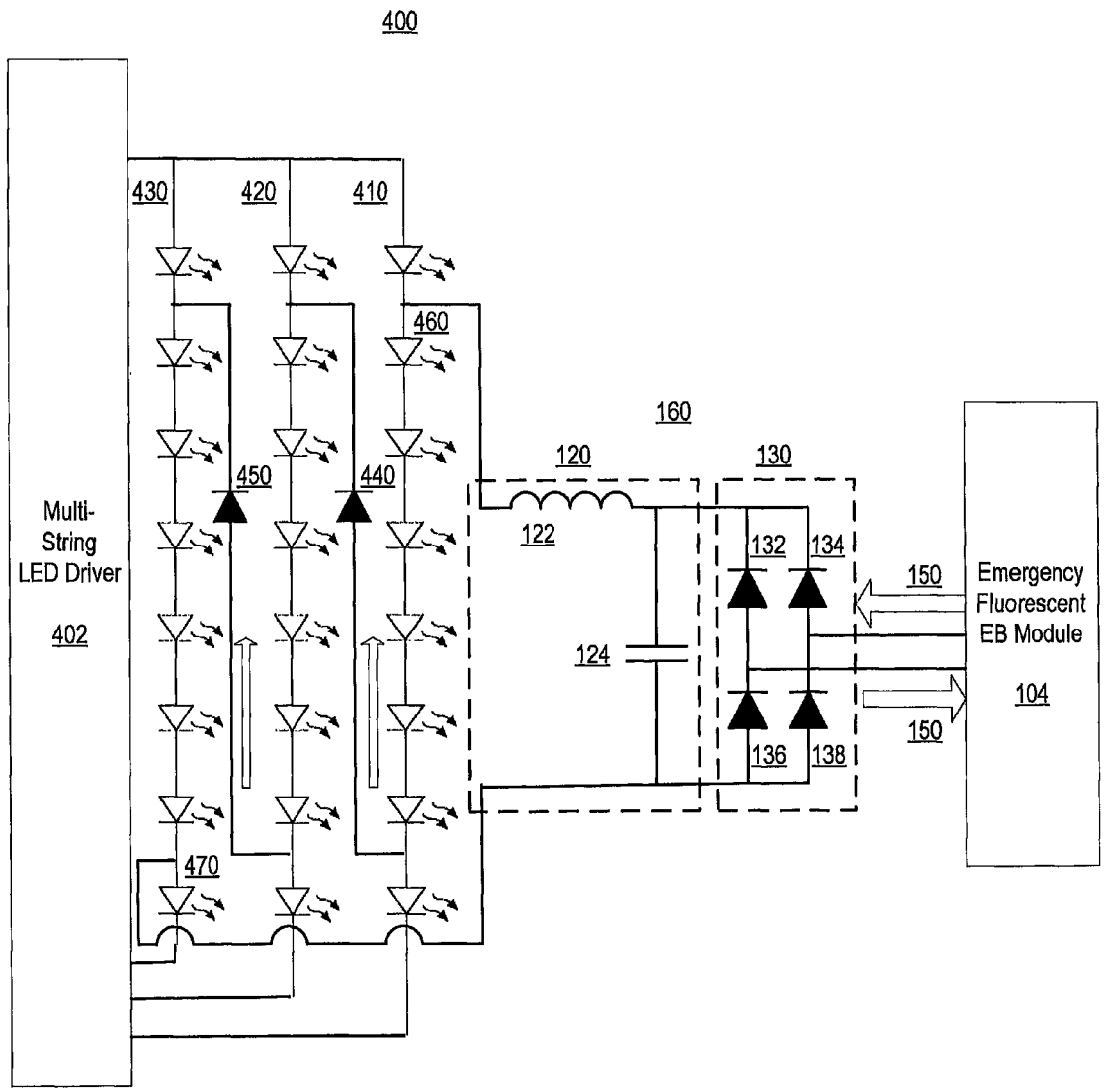
FIG. 4 is a diagram of an emergency lighting device for powering solid state emitters with a fluorescent emergency lighting module, according to various embodiments.

FIG. 4 illustrates lighting device 400, which may increase string voltage closer to the level of a fluorescent tube, according to some embodiments. The emergency lighting device 400 includes multiple strings, such as first LED string 410, second LED string 420 and third LED string 430. Each string may be a different color. In other cases, some strings may share a color. For example, LED strings 410 and 420 may emit a BSY light while LED string 430 may emit a red light, the resulting mixture or sub-mixture of emitted light achieving a target white color with a high CRI index of 80 or more.

In the lighting device 400, normal operation currents supplied to the LED strings 410, 420 and 430 may be provided by a multi-string LED driver 402, which may supply current separately to each LED string. The strings may be controlled together or independently. Upon a determination of an emergency mode, the LED strings 410, 420 and 430 may receive a converted emergency operation current from the passive resonant converter circuit 160 at emergency input 460, which is output at emergency output 470. The supplied emergency operation current may be similar or less than the normal operation current. Currents may be supplied differently to different LED strings.

According to some embodiments, the lighting device 400 may include a first diode 440 that is added to electrically connect LED string 410 and LED string 420. The anode of diode 440 is connected to LED string 410 and the cathode of diode 440 is connected to LED string 420 such that the normal operation current does not flow through the path of diode 440. In various embodiments, diode 440 is reverse biased, which is consistent with the polarity of the normal operation voltage applied to LED strings 410-430. In further embodiments, a second diode 450 is added to electrically connect LED string 420 and LED string 430. The anode of diode 450 is connected to LED string 420 and the cathode of diode 450 is connected to LED string 430 such that the normal operation current does not flow through the path of diode 450. In various embodiments, diode 450 is also reverse biased.

In emergency mode, converted emergency operation current flows from the passive resonant converter circuit 160 into LED string 410 at the emergency input 460, through LED string 410, through diode 440, through LED string 420, through diode 450 and into LED string 430. The converted emergency operation current continues out the emergency output 470. Note that the lighting device 400 may be configured in other embodiments such that the current flows through any combination of LED strings 410-430. Benefits of the configuration of the lighting device 400 include the ability to power select strings of a multi-string arrangement during emergency operation. In some cases, the LED strings 410-430 may be configured to emit different colors, and selecting different or fewer strings may purposely achieve an alternate target color due to the change in the mixture of light.

For example, LED strings 410 and 420 may be strings of BSY LEDs while string 430 is a string of red LEDs. The combination of the LEDs of the three LED strings 410-430 may then emit a mixture of light that presents a target white light with a higher CRI. Such a target white light may be defined by a CIE area within a polygon defined by line segments having endpoints at various defined CIE coordinates. Example coordinates are discussed in the applications incorporated above.

Therefore, in such embodiments, if in emergency mode, only one BSY and one red string are emitting light, the target light color may be of a lesser CRI or a different color. In emergency operation, CRI may be less of a concern. However, the remaining LED strings are able to still provide a similar color or a sufficiently white light. Also, a ratio of LEDs in each string during emergency mode may be adjusted to maintain the same color as in normal operation.

Figure 5:
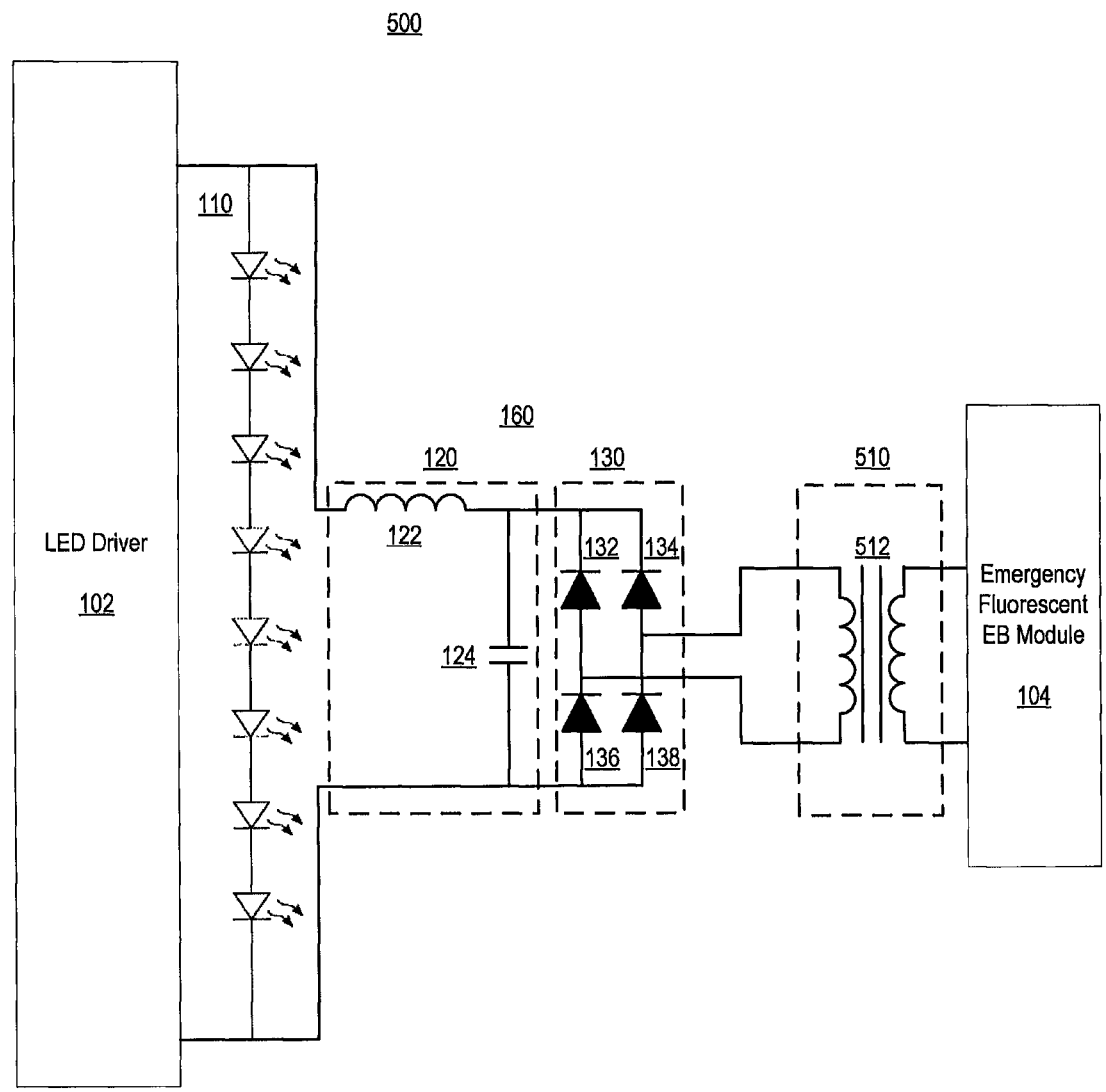
FIG. 5 is a diagram of an emergency lighting device for powering solid state emitters with an electrically isolated fluorescent emergency lighting module, according to various embodiments.

Galvanic isolation may also be provided, according to some embodiments. For example, as shown in FIG. 5, lighting device 500 may include diode bridge rectifier circuit 130, CL resonant circuit 120 coupled to an output of rectifier circuit 130, and LED string 110, which may operate as described above. The input of the rectifier circuit 130 is coupled to the emergency fluorescent lighting module 104 using an isolation circuit 510. The isolation circuit 510 may include an isolating transformer 512, which may be a Class 2 isolation transformer. In particular, a secondary winding of the transformer 512 may be coupled to the input of the diode bridge rectifier circuit 130, and a primary winding of the transformer 512 may be coupled to the output of the emergency fluorescent lighting module 104.

Figure 6:
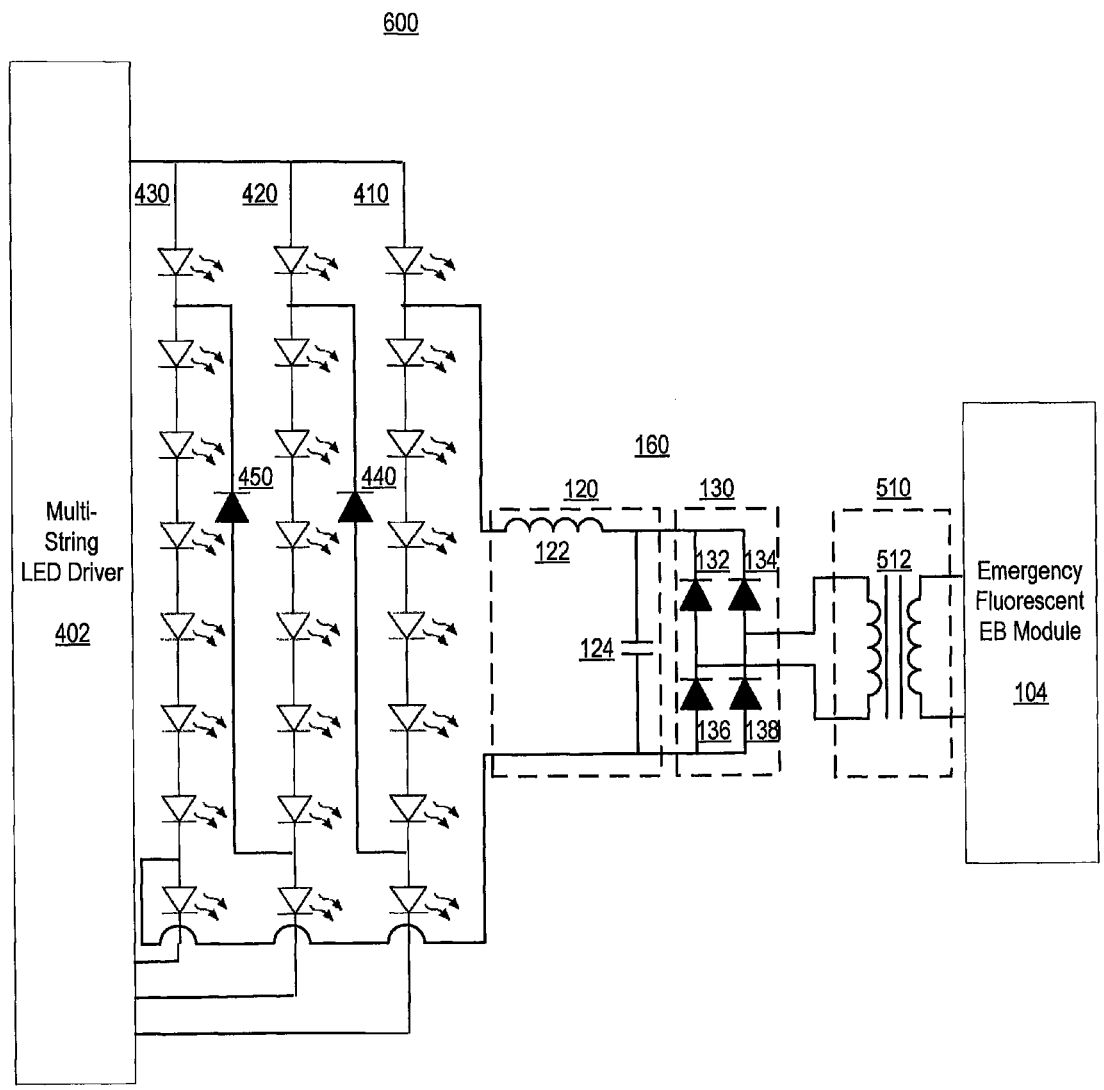
FIG. 6 is a diagram of an emergency lighting device for powering solid state emitters with an electrically isolated fluorescent emergency lighting module, according to various embodiments.
Figure 7:
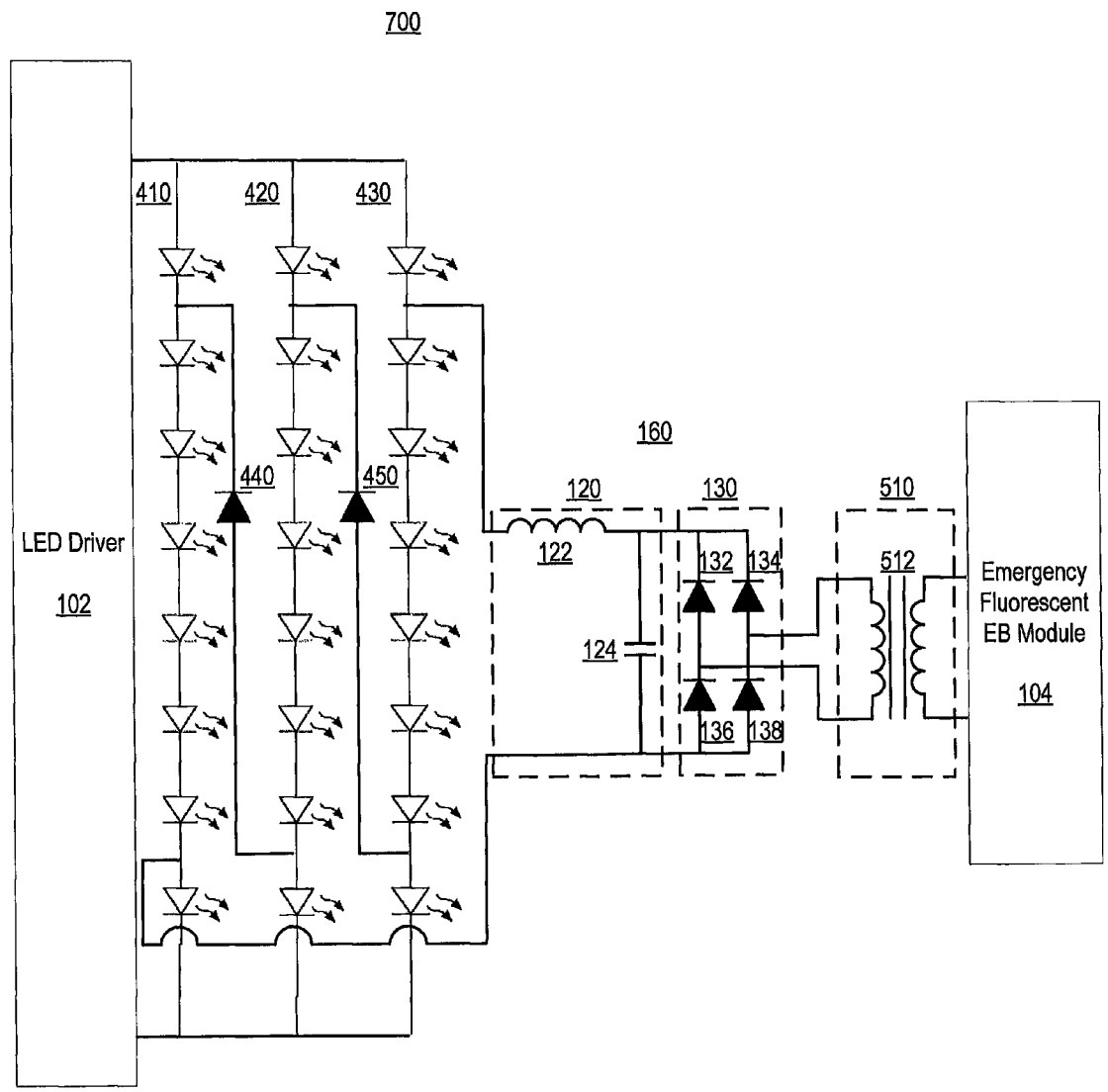
FIG. 7 is a diagram of an emergency lighting device for powering solid state emitters with an electrically isolated fluorescent emergency lighting module, according to various embodiments.

FIG. 6 illustrates lighting device 600, according to some embodiments, which is similar to lighting device 400 except that lighting device 600 includes an isolation circuit 510. According to some embodiments, FIG. 7 illustrates lighting device 700, which is similar to FIG. 6 except that the LED strings 410-430 are driven by a single string LED driver 102.

Figure 8:
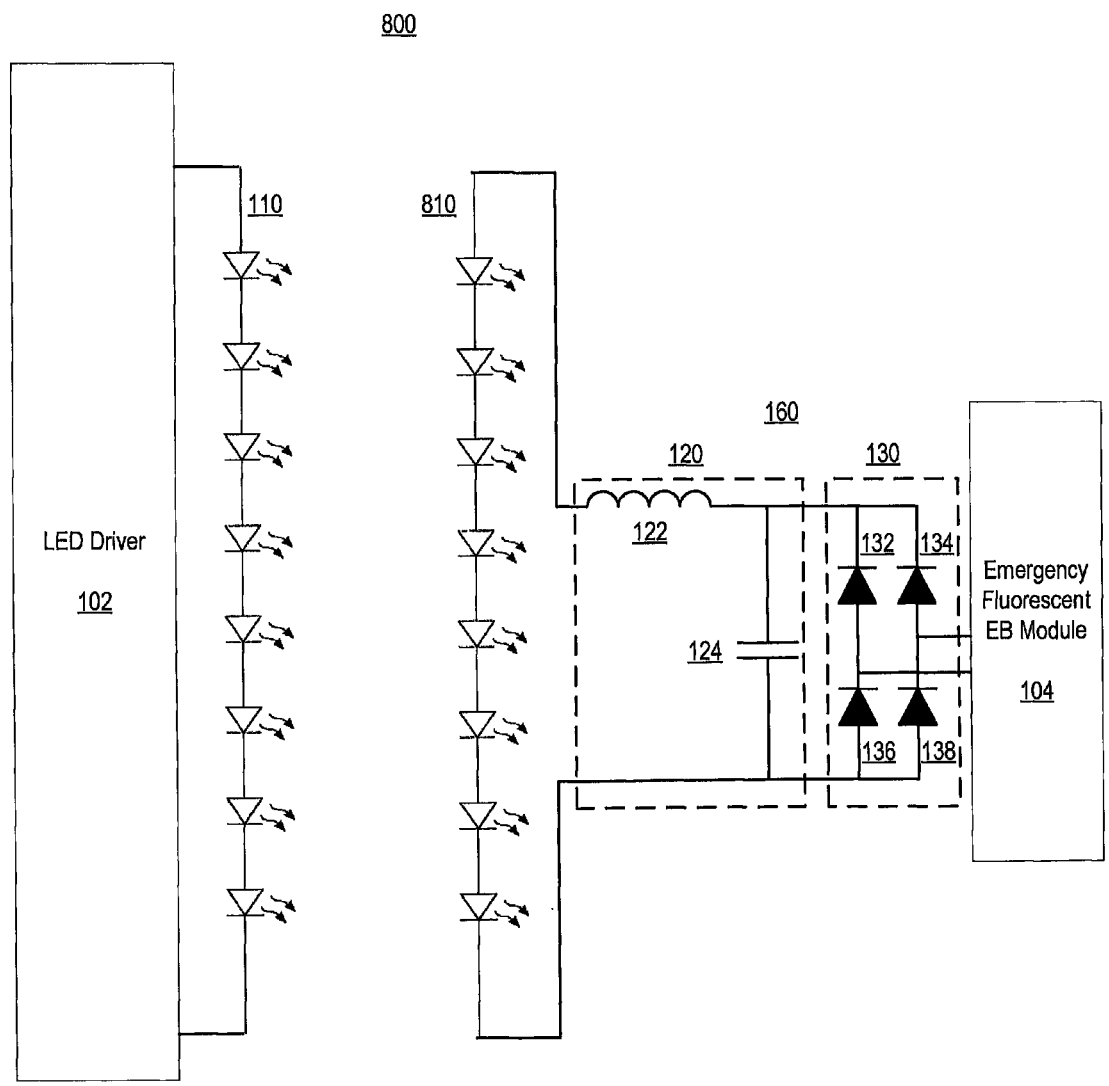
FIG. 8 is a diagram of an emergency lighting device for powering solid state emitters with a fluorescent emergency lighting module, according to various embodiments.

FIG. 8 illustrates lighting device 800, according to some embodiments. The lighting device 800 drives the LED string 110 with the LED driver 102 in normal operation mode. The emergency fluorescent lighting module 104 drives the LED string 810 through the passive resonant converter circuit 160 in emergency operation mode.

Figure 9:
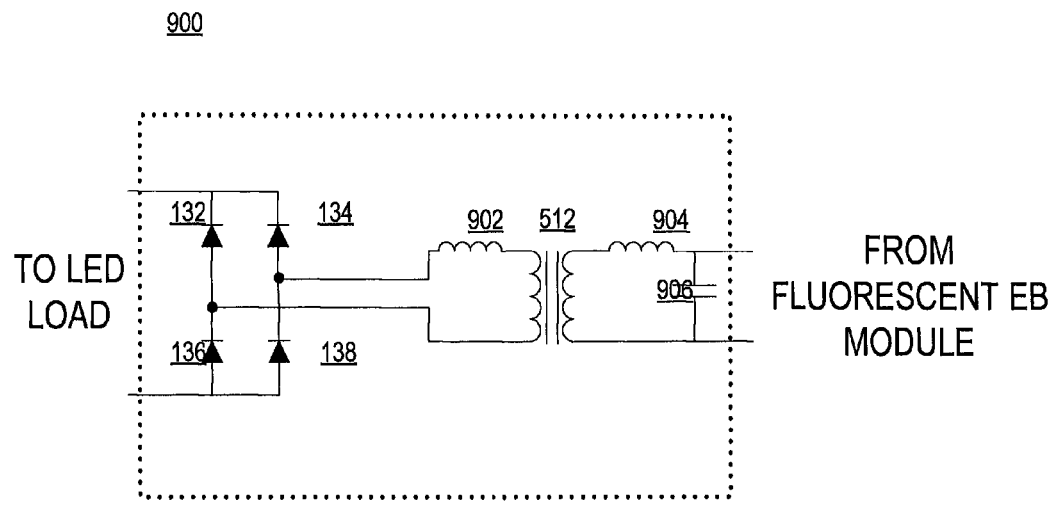
FIG. 9 is a diagram of an emergency lighting device for powering solid state emitters with a fluorescent emergency lighting module, according to various embodiments.

FIG. 9 illustrates lighting device 900, which is extended such that leakage inductors 902 and 904 and the isolation transformer 512 are combined into one component, according to some embodiments. The leakage inductance of the inductor 904 of the transformer 512 is used to satisfy the filtering function that the inductor 904 previously met with a capacitor 906.

Figure 10:
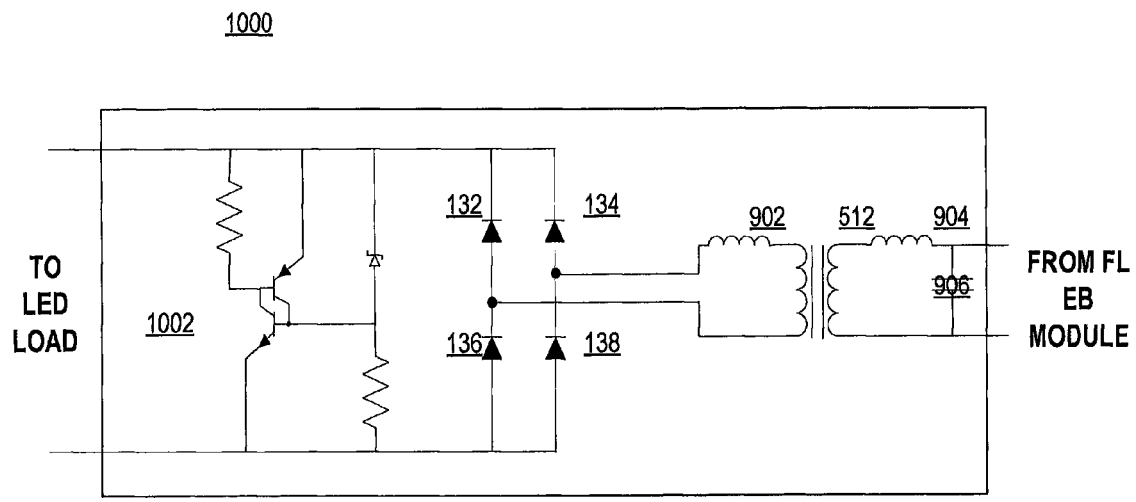
FIG. 10 is a diagram of an emergency lighting device for powering solid state emitters with a fluorescent emergency lighting module, according to various embodiments.

FIG. 10 illustrates lighting device 1000, which is extended to show a voltage protection circuit 1002 that is added to prevent the output of the add-on circuit from ever going above the voltage limitations of UL Class 2 applications (60V or 42.4V, depending on application). The function of the additional circuit is to latch the output of the converter below the Class 2 limits during an open-circuit or other fault condition. An add-on circuit can be included on an LED PCB or on an add-on module that allows that same LED load to be run off fluorescent emergency lighting module 104 during a power outage or other fault condition.

FIGS. 1-10 illustrate various embodiments for arranging resonant circuit 120, the rectifier circuit 130 and the isolation circuit 510 to interface LED strings with fluorescent emergency lighting modules. However, the components of the resonant circuit 120, the rectifier circuit 130 and the isolation circuit 510 may form various other arrangements. For example, some arrangements interfacing LED strings to fluorescent emergency lighting ballasts may be configured similar to the embodiments described in a related application entitled "LED LIGHTING APPARATUS FOR. USE WITH AC-OUTPUT LIGHTING BALLASTS," U.S. patent application Ser. No. 13/943,455 filed Jul. 16, 2013, filed concurrently with this application, the disclosure of which is incorporated by reference in its entirety.

Components of the embodiments described herein may be arranged in a number of different physical forms. These forms may include, but are not limited to, complete lighting apparatus, replacement lamps, lamp replacement sets (or kits) and/or modules or other circuit assemblies for lamp replacement applications. Replacement lamps may be, for example, plug-in or screw-in replacements for conventional fluorescent tubes, CFLs or other types of lamps that use ballasts that produce AC outputs, such as HID lamps. Lamp replacement kits or sets may include, for example, one or more lamps configured to be plugged or screwed into one or more existing lamp connectors (e.g., screw-in or plug-in sockets, clamps or other electrical connectors), along with circuit modules that are configured to interface the fixture connectors to a ballast using, for example, spliced connections in existing wiring and/or replacement wiring harnesses or sets.

Figure 11:
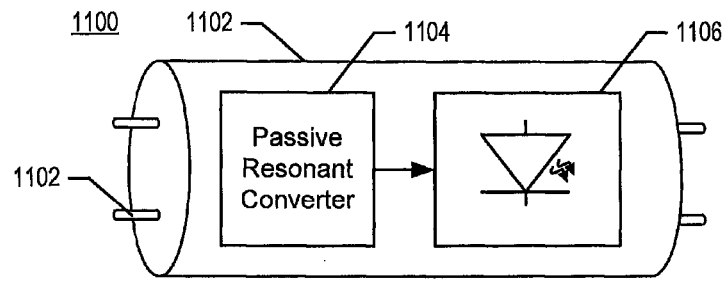
FIGS. 11 and 12 are lamps, according to various embodiments.

For example, FIG. 11 illustrates, according to some embodiments, an LED-based replacement lamp 1100 for fluorescent tube lamp replacement. The replacement lamp 1100 includes an at least partially translucent housing 1102. At least one LED string 1106 is positioned in the housing 1102 and configured to provide illumination through at least one translucent portion of the housing 1102. The LED string(s) 1106 is coupled to an output of a passive resonant converter circuit 1104, which may operate as discussed above. An input of the passive resonant converter circuit 1104 may be coupled to at least one external contact of lamp 1100, here shown as at least one of pins 1102 configured to mate with contacts of lamp sockets. The contacts of the lamp socket are coupled to the emergency fluorescent lighting module 104, e.g., a ballast originally used to drive a conventional fluorescent tube.

Figure 12:
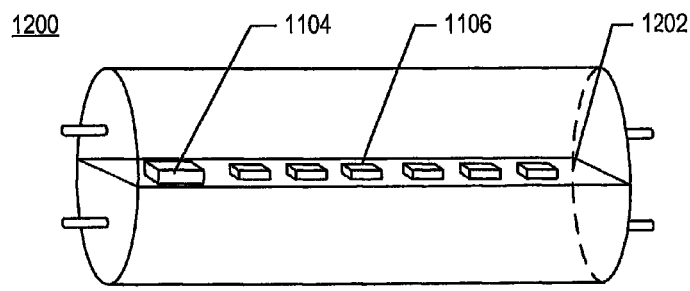

FIG. 12 illustrates, according to some embodiments, an example of an internal physical layout of the replacement tube 1100, including the passive resonant converter circuit 1104 and the LED string(s) 1106 supported on a substrate 1202, e.g., a printed circuit board and/or other supporting structure that provides mechanical support and that facilitates electrical interconnection of these components using, for example, circuit traces and/or wires.

Figure 13:
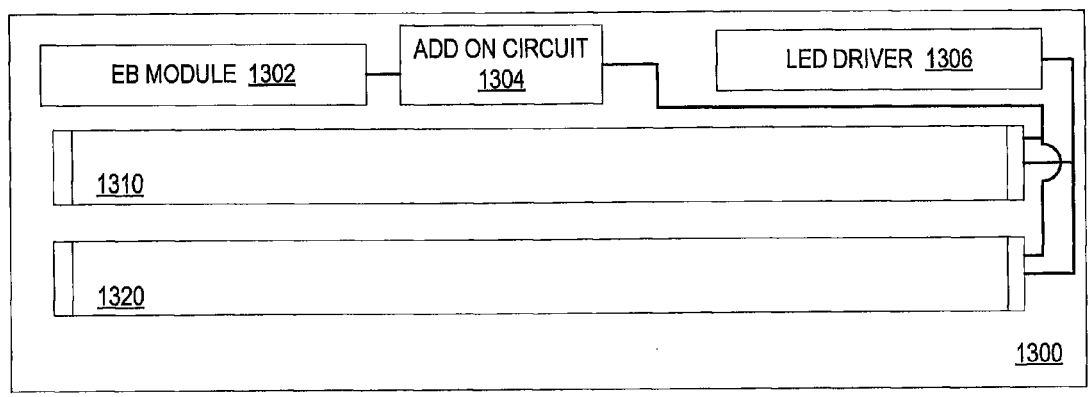
FIG. 13 illustrates an emergency lighting device in a fluorescent lamp arrangement, according to various embodiments.

According to further embodiments, a lamp may be configured to include a portion of a passive resonant converter circuit, with other portions of the passive resonant converter circuit positioned outside of the lamp and connected thereto via wiring, such that the lamp and external circuitry serve as a lamp replacement set or kit. For example, FIG. 13 illustrates a lighting device, according to some embodiments, such as lamp 1300, including LED strings/lamp bulbs 1310 and 1320 that are encased in housings that fit in place of standard fluorescent tubes. The lamp 1300 also includes fluorescent emergency lighting module 1302, add-on circuit 1304 and LED driver 1306. The LED driver 1306 drives LED strings 1310 and 1320 during normal operation. The add-on circuit 1304 includes a passive resonant converter circuit, such as the passive resonant converter circuit 160. The passive resonant converter circuit of the add-on circuit 1304 may include a resonant circuit (e.g., a resonant CL circuit as described above) coupled to a passive rectifier circuit. The add-on circuit 1304 may take the form, for example, of a module that may be spliced into existing wiring or otherwise electrically connected to a ballast and lamp sockets in a fluorescent lighting fixture. The components of the add-on circuit 1304 may be configured to be in various arrangements, including in a lamp replacement set or kit.

As noted above, some embodiments of the inventive subject matter are applicable to other types of ballast-driven lighting devices, including gas-discharge lamp devices such as HID devices (e.g., mercury vapor, metal halide, sodium vapor, xenon arc, etc.), low pressure sodium devices and CFLs. Example embodiments of a lamp suitable for use as an LED based lamp in a fluorescent lighting system are described in a related application entitled "LED LAMP". U.S. patent application Ser. No. 13/943,152, by Medendorp et al., filed Jul. 16, 2013, the disclosure of which is incorporated by reference in its entirety.

Figure 14:
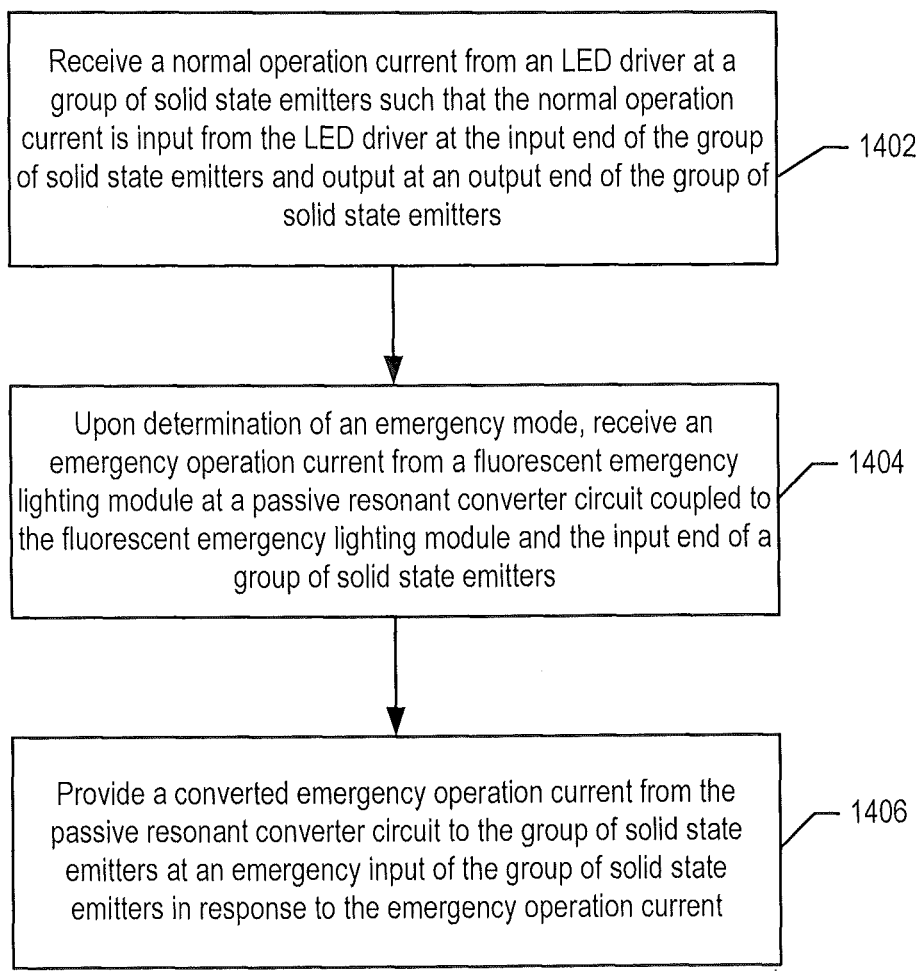
FIG. 14 is a flowchart that illustrates a method of operating an emergency lighting device, according to various embodiments.

Methods of operating an emergency lighting device are also provided. FIG. 14 shows a flowchart of a method 1400 for operating an emergency lighting device, according to some embodiments. A normal operation current is received from an LED driver at a group of solid state emitters such that the normal operation current is input from the LED driver at the input end of the group of solid state emitters and output at an output end of the group of solid state emitters (block 1402).

Upon determination of an emergency mode, an emergency operation current is received from a fluorescent emergency lighting module at a passive resonant converter circuit coupled to the fluorescent emergency lighting module and the input end of a group of solid state emitters (block 1404). In other embodiments, the emergency output may be located between the input end and output end of the first group. This block may include determining that a normal operation current, voltage or power supplied to the lighting device has dropped below or failed to satisfy a threshold. When such a reduction is detected, the emergency operation mode may supplement or replace the reduction in current using a fluorescent emergency lighting module. The LED driver may be notified to disable itself completely. As described above, an emergency module may use a microcontroller to switch to emergency operation mode. In other embodiments, rather than receiving the currents, a method may include supplying the normal operation current and emergency operation current.

At block 1406, a converted emergency operation current is provided from the passive resonant converter circuit to the group of solid state emitters at an emergency input of the group of solid state emitters in response to the emergency operation current.

Figure 15:
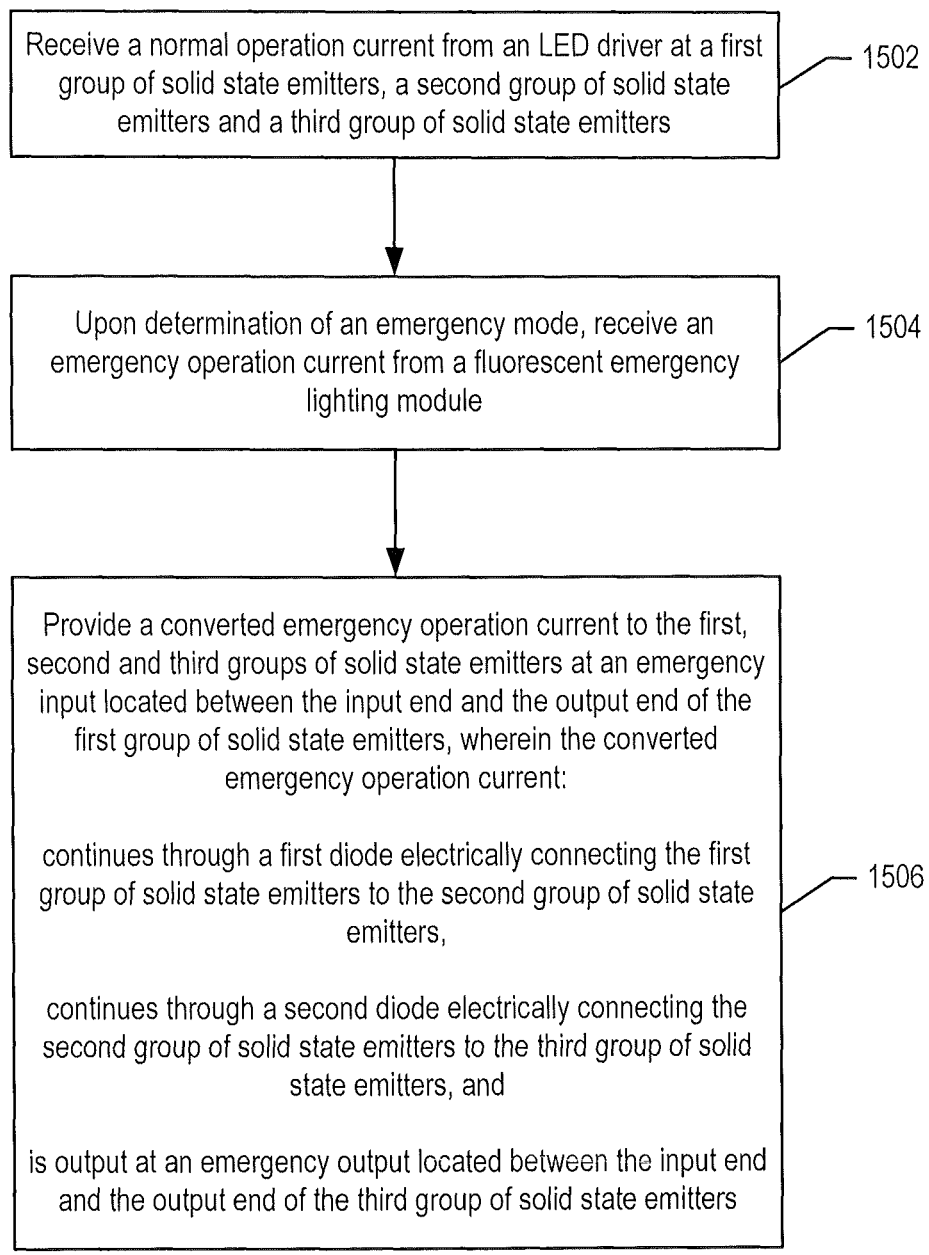
FIG. 15 is a flowchart that illustrates another method of operating an emergency lighting device, according to various embodiments.

FIG. 15 shows another method 1500 for operating an emergency lighting device, according to some embodiments. A normal operation current is received from an LED driver at first, second and third groups of solid state emitters (block 1502). Upon determination of an emergency mode, an emergency operation current is received from a fluorescent emergency lighting module (block 1504).

At block 1506, a converted emergency operation current is provided to the first, second and third groups of solid state emitters at an emergency input located between the input end and the output end of the first group of solid state emitters, wherein the converted emergency operation current continues through a first diode electrically connecting the first group of solid state emitters to the second group of solid state emitters, continues through a second diode electrically connecting the second group of solid state emitters to the third group of solid state emitters, and is output at an emergency output located between the input end and the output end of the third group of solid state emitters.

In some embodiments, a mixture of light emitted from the first, second and third groups of solid state emitters produces a target white light (CRI of at least 80) under normal operation and a lower CRI or dimmer white light in emergency operation mode.

The embodiments of emergency lighting devices described above provide more targeted lights with a greater flexibility to account for emergency drivers of different specifications. Various combinations of colors may be used, including color mixtures that more efficiently provide a white color with a relatively high CRI.

Embodiments described above also allow for use of a fluorescent emergency lighting module (ELM) while installing LED lighting. One example includes upgraded lighting from Fluorescent T8 lighting to LED lighting. Previously, if the old installation already included an ELM solution that was Fluorescent T8 based, the customer would need to replace the ELM solution with an LED lighting compatible ELM product. Since ELM products can be comparatively expensive, this could significantly impact the return on investment story of an upgrade to LED lighting. Embodiments described herein allow for increased flexibility and significant potential cost savings by enabling a customer to keep their existing fluorescent ELM product installed and use it directly with the new LED lighting solution.

Another advantage becomes apparent when an LED lighting accessory is not available that meets the needs of an installation. Since fluorescent technology has been available much longer, there are many more options on the market for fluorescent accessories such as ELM. The embodiments described above allow for selection of accessories from these conventional options until more LED options become available.

Many different embodiments have been disclosed herein, in connection with the above description and the drawings. Although specific terms are employed, they are used in a generic and descriptive sense only and not for purposes of limitation, the scope of the inventive subject matter being set forth in the following claims. Also, it will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. An emergency lighting apparatus comprising:
a passive resonant converter circuit configured to be coupled to an emergency lighting module and to an input end of a group of solid state emitters, at which the group of solid state emitters receives a normal operation current from an LED driver,
wherein the passive resonant converter circuit is configured to receive an emergency operation current from the emergency lighting module and to provide a converted emergency operation current to the group of solid state emitters at an emergency input of the group of solid state emitters in response to the emergency operation current.

2. The emergency lighting device of claim 1, wherein the emergency lighting module is a fluorescent emergency lighting module.

3. The emergency lighting device of claim 1, wherein the passive resonant converter circuit is configured to support power transfer from the emergency lighting module to the group of solid state emitters without active voltage or current regulation.

4. The emergency lighting device of claim 1, further comprising an isolation transformer coupled to the passive resonant converter circuit and configured to receive the emergency operation current.

5. The emergency lighting device of claim 1, wherein the passive resonant converter circuit comprises a passive rectifier circuit and a resonant circuit.

6. The emergency lighting device of claim 5, wherein an input of the passive rectifier circuit is configured to be coupled to the emergency lighting module and wherein the resonant circuit and the emergency input of the group of solid state emitters are coupled to the passive rectifier circuit.

7. The emergency lighting device of claim 6, wherein the resonant circuit comprises a resonant CL circuit comprising at least one inductor coupled in series with the group of solid state emitters and at least one capacitor coupled in parallel with the at least one inductor and the group of solid state emitters.

8. The emergency lighting device of claim 5, wherein an input of the resonant circuit is configured to be coupled to the emergency lighting module and wherein the passive rectifier circuit is coupled between the resonant circuit and the emergency input of the group of solid state emitters.

9. The emergency lighting device of claim 8, wherein the resonant circuit comprises a resonant CL circuit comprising a first inductor coupled in series with the emergency lighting module and at least one capacitor coupled in parallel with the emergency lighting module.

10. The emergency lighting device of claim 9, further comprising:
a second inductor coupled in series between the first inductor and the passive rectifier circuit; and
an isolation transformer coupled between the first and second inductors.

11. An emergency lighting device, comprising:
a first group of solid state emitters configured to emit light of a first color and having an input end and an output end; and
a passive resonant converter circuit coupled to an emergency lighting module and to the input end of the first group of solid state emitters, wherein the first group of solid state emitters is configured to receive a normal operation current from an LED driver at the input end of the group of solid state emitters,
wherein the passive resonant converter circuit is configured to receive an emergency operation current from the emergency lighting module and provide a converted emergency operation current to the first group of solid state emitters at an emergency input of the first group of solid state emitters.

12. The emergency lighting device of claim 11, wherein the emergency lighting module is a fluorescent emergency lighting module.

13. The emergency lighting device of claim 11, wherein the emergency input is located between the input end and the output end of the first group of solid state emitters such that only a first portion of the first group of solid state emitters receives the converted emergency operation current, wherein the first portion comprises fewer solid state emitters than the first group of solid state emitters.

14. The emergency lighting device of claim 11, further comprising:
a second group of solid state emitters configured to emit light of a second color having an input end and an output end, wherein the input end of the second group of solid state emitters is electrically connected in series to the output end of the first group of solid state emitters, wherein the output end of the second group of solid state emitters is configured to output the normal operation current, and wherein the second group of solid state emitters is configured to receive the converted emergency operation current from the output end of the first group of solid state emitters and output the converted emergency operation current at an emergency output, wherein the emergency input and the emergency output are located between the input end of the first group of solid state emitters and the output end of the second group of solid state emitters.

15. The emergency lighting device of claim 14, wherein the converted emergency operation current causes the first and second groups of solid state emitters to emit a mixture of light that matches a mixture of light caused by the normal operation current.

16. The emergency lighting device of claim 14, wherein the converted emergency operation current causes the first and second groups of solid state emitters to emit a mixture of light that is different than a mixture of light caused by the normal operation current.

17. A method of operating an emergency lighting device, comprising:
    receiving a normal operation current from an LED driver at a group of solid state emitters such that the normal operation current is input from the LED driver at the input end of the group of solid state emitters and output at an output end of the group of solid state emitters; and
    upon determination of an emergency mode, receiving an emergency operation current from an emergency lighting module at a passive resonant converter circuit coupled to the emergency lighting module and the input end of a group of solid state emitters; and
    providing a converted emergency operation current from the passive resonant converter circuit to the group of solid state emitters at an emergency input of the group of solid state emitters in response to the emergency operation current.

18. The method of claim 17, wherein the emergency lighting module is a fluorescent emergency lighting module.

19. The method of claim 17, wherein the providing the converted emergency operation current comprises providing the converted emergency operation current without active voltage or current regulation.

20. The method of claim 17, further comprising galvanically isolating the passive resonant converter circuit from the emergency lighting module.

21. An emergency lighting device comprising:
    a first group of solid state emitters configured to emit light of a first color having an input end and an output end;
    a second group of solid state emitters configured to emit light of a second color having an input end and an output end; and
    a third group of solid state emitters configured to emit light of a third color and having an input end and an output end, wherein the first, second and third groups of solid state emitters are configured to receive a normal operation current from an LED driver during normal mode at the input ends of the first, second and third groups of solid state emitters; and
    a passive resonant converter circuit configured to be coupled to an emergency lighting module and to an emergency input of the first, second and third groups of solid state emitters, wherein the passive resonant converter circuit is configured to receive an emergency operation current from the emergency lighting module during emergency mode and provide a converted emergency operation current to the first, second and third groups of solid state emitters at the emergency input.

22. The emergency lighting device of claim 21, wherein the emergency lighting module is a fluorescent emergency lighting module.

23. The emergency lighting device of claim 21, wherein the first color and the second color are the same color.

24. The emergency lighting device of claim 21, wherein the first color and the second color are different colors.

25. The emergency lighting device of claim 24, wherein the second color and the third color are different colors.

26. The emergency lighting device of claim 25, wherein the emergency location of the second group of solid state emitters and the emergency location of the third group of solid state emitters are configured such that the mixture of light emitted by the second group of solid state emitters and the third group of solid state emitters is a target color.

27. The emergency lighting device of claim 21, further comprising:
    a first diode electrically connected between a location on the first group of solid state emitters and a first location on the second group of solid state emitters; and
    a second diode electrically connected between a second location on the second group of solid state emitters and a location on the third group of solid state emitters, wherein, upon determination of an emergency mode, the converted emergency operation current is input at an emergency location of the first group of solid state emitters and output at an emergency location of the third group of solid state emitters.

28. The emergency lighting device of claim 21, wherein the emergency lighting module is a multi-string LED driver configured to separately provide normal operation current to the input ends of the first, second and third groups of solid state emitters.

29. The emergency lighting device of claim 21, further comprising an isolation transformer coupled to the passive resonant converter circuit and configured to receive the emergency operation current.

30. The emergency lighting device of claim 21, wherein the first, second and third groups of solid state emitters emit a mixture of light under emergency operation mode that is a target white color with a Color Rendering Index (CRI) of at least 80.

31. A method of operating an emergency lighting device, comprising:
    receiving a normal operation current from an LED driver at a first group of solid state emitters, a second group of solid state emitters and a third group of solid state emitters;
    upon determination of an emergency mode, receiving an emergency operation current from an emergency lighting module; and
    providing a converted emergency operation current to the first, second and third groups of solid state emitters at an emergency input located between the input end and the output end of the first group of solid state emitters, wherein the converted emergency operation current continues through a first diode electrically connecting the first group of solid state emitters to the second group of solid state emitters, continues through a second diode electrically connecting the second group of solid state emitters to the third group of solid state emitters, and is output at an emergency output located between the input end and the output end of the third group of solid state emitters.

32. The method of claim 31, wherein the emergency lighting module is a fluorescent emergency lighting module.

33. The method of claim 31, wherein the providing the converted emergency operation current comprises providing the converted emergency operation current without active voltage or current regulation.

34. The method of claim 31, further comprising galvanically isolating the passive resonant converter circuit from the emergency lighting module.

* * * * *